Oct. 7, 1930. N. GREGORIEFF 1,777,362
SIGNAL CONTROL SWITCH
Filed Oct. 30, 1926 4 Sheets-Sheet 4
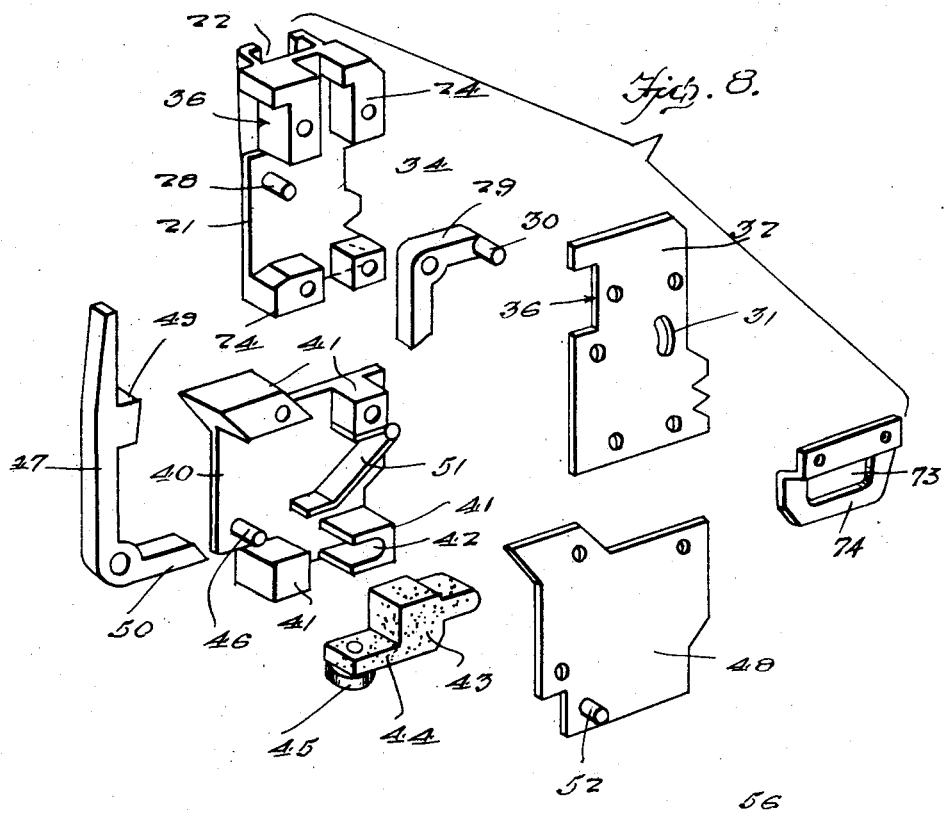
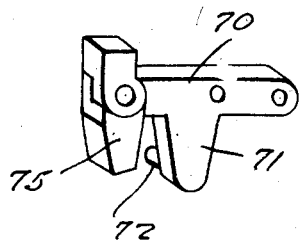
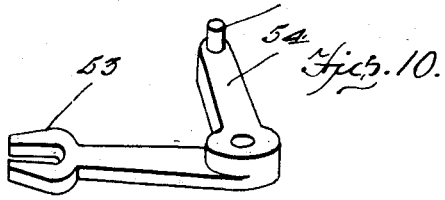
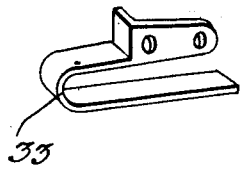
Inventor
N. Gregorieff
By *Clarence A. O'Brien*
Attorney Patented Oct. 7, 1930

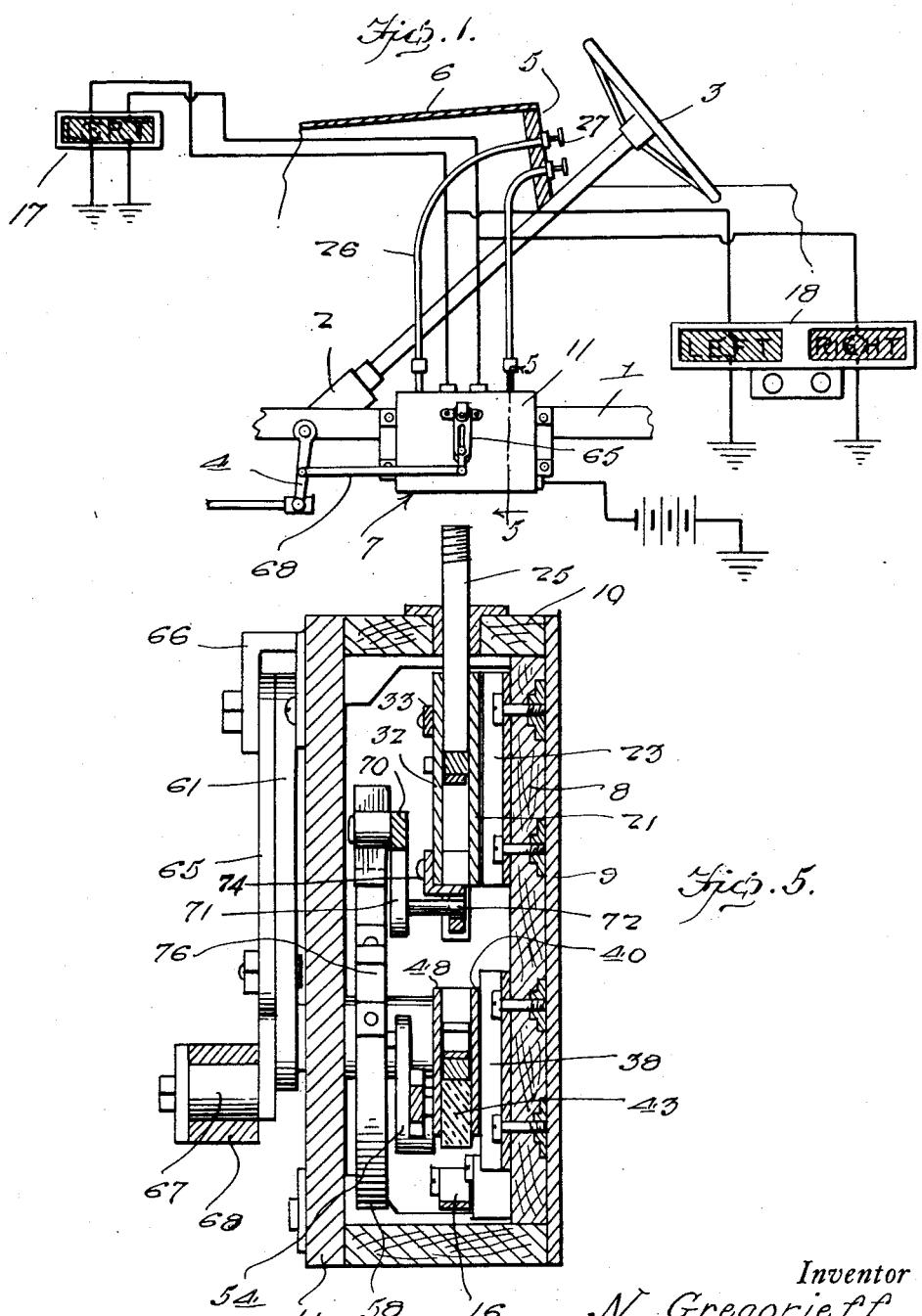

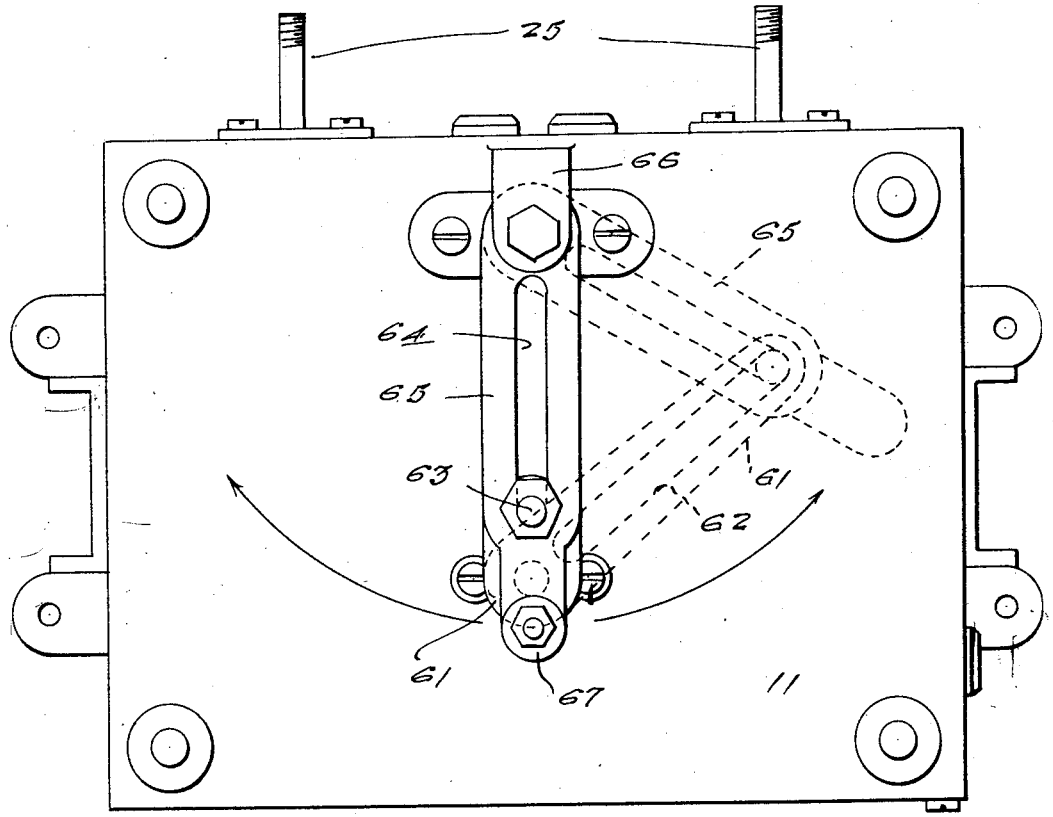
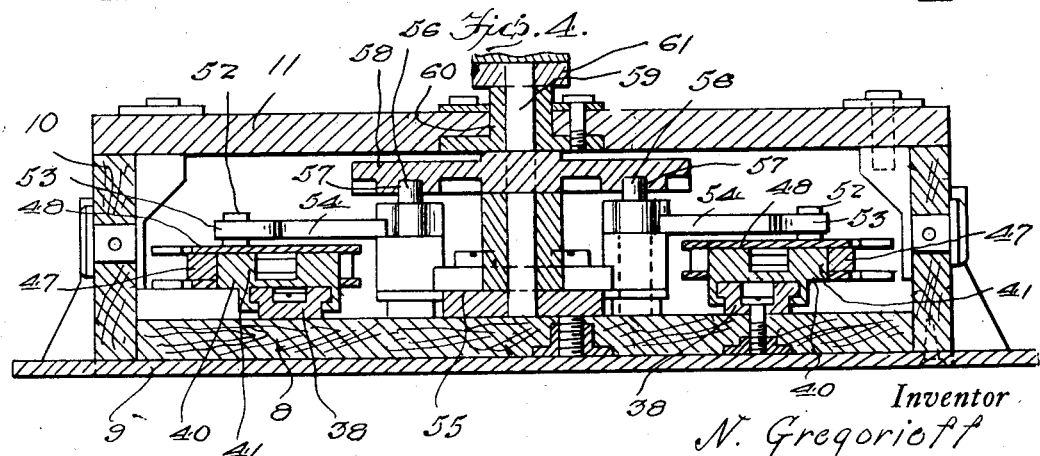

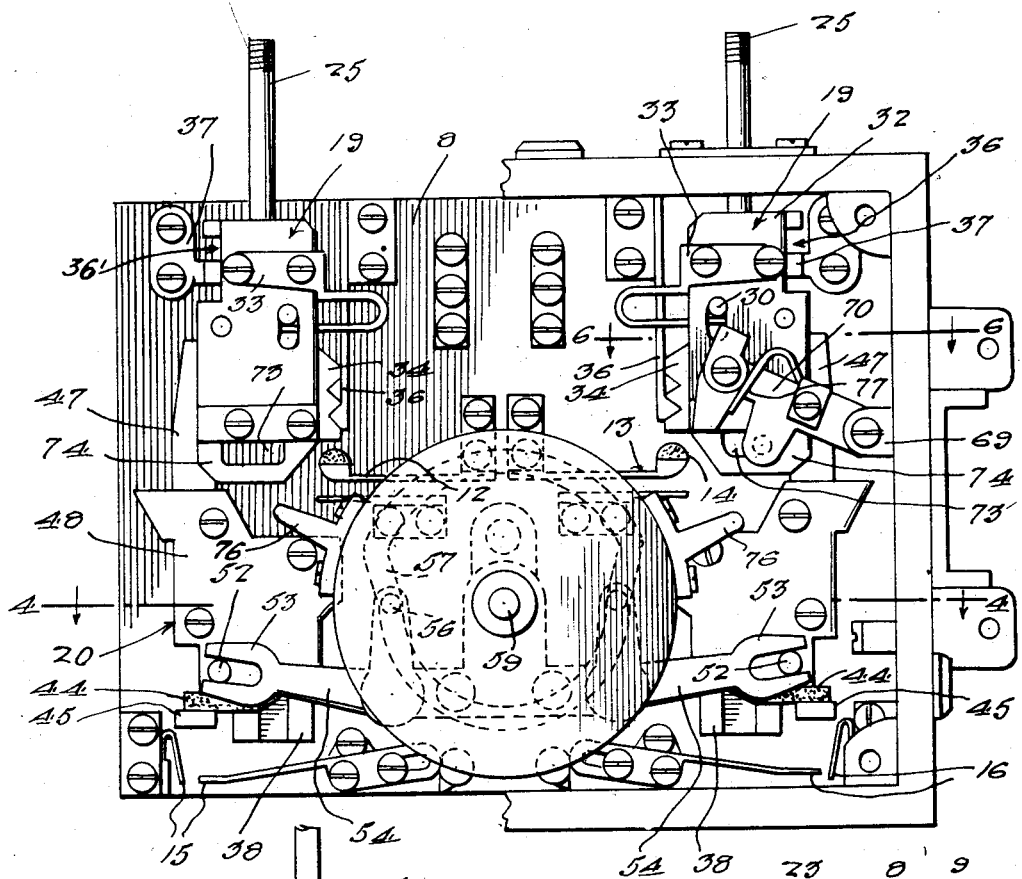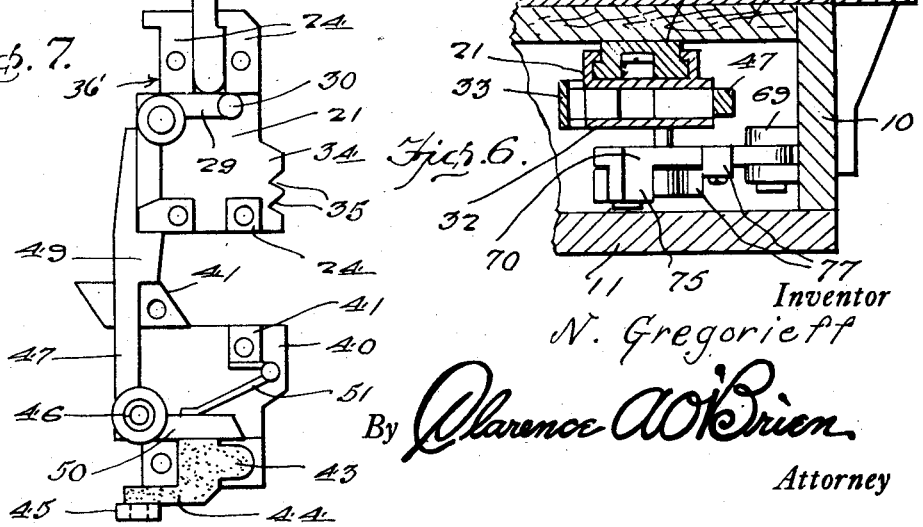

1,777,362

UNITED STATES PATENT OFFICE

NICHOLAS GREGORIEFF, OF SCOTIA, CALIFORNIA

SIGNAL-CONTROL SWITCH

Application filed October 30, 1926. Serial No. 145,255.

This invention relates to improvements in automobile direction signals and particularly in a control switch construction therefor operated manually as well as by the steering mechanism in cooperation for the proper control of right and left direction signals.

This invention comprehends the provision of a switch mechanism adapted to be mounted on the frame of a motor vehicle for association with the steering mechanism of a vehicle through a link and lever connection whereby suitable mechanism within the switch construction is operated for controlling a pair of contact members for the right and left signal elements while suitable manually actuated means is associated in said switch construction with the steering gear actuating means in such a manner that the operation of the signals through the closing of the switch members is controlled through the relative cooperation between the manually actuated means and the steering gear actuating means in order to prevent a giving of false turning signals in the normal operation of the automobile or motor vehicle.

This invention comprehends numerous other objects residing in the details of construction and association of the parts of the switch mechanism which are more particularly pointed out in the following detailed description and the claims directed to a preferred form of construction, it being understood however that various changes in the size, shape, arrangement and association of the parts may be made without departing from the spirit and scope of the invention as herein set forth.

In the drawings forming part of this application,

Figure 1 is a view showing a portion of the steering mechanism and the instrument board of an automobile to which the switch mechanism is applied and operatively connected with wiring connections between the switch mechanism and the direction signals, Fig. 2 is an enlarged side elevation of the exterior of the casing for the switch mechanism showing the operating lever structure in detail which is connected for operation by the steering mechanism, Fig. 3 is a side elevational view of the switch mechanism with the cover removed and portions broken away showing in detail the relation of parts in the casing controlling the operation of the switches and the direction signals, Fig. 4 is a horizontal sectional view taken on the line 4—4 of Fig. 3, Fig. 5 is a vertical sectional view taken on line 5—5 of Fig. 1, Fig. 6 is a fragmentary horizontal sectional view taken on line 6—6 of Fig. 3, Fig. 7 is a detailed elevational view of one set of switch controlling elements as shown in Fig. 3 removed from the casing and having the light members on one side thereof removed for illustrating the details of construction of the parts, Fig. 8 is a disassembled perspective of one of the switch-controlling mechanisms for one of the signals as shown in Fig. 3 to more clearly illustrate the construction and assembly of the parts, Fig. 9 is a detailed perspective of the cam-operated lever, Fig. 10 is a perspective of one of the main valve crank levers, Fig. 11 is a detail perspective of one of the latch controlling spring members carried by the manually operated switch control mechanism.

A chassis bar of a motor vehicle is indicated at 1 with which the steering mechanism 2 operated by the usual steering wheel 3 is associated and on which it is mounted for operation of the steering arm 4 in any well known manner. The instrument board of a motor vehicle is indicated at 5 and cowl at 6 while the improved switch mechanism constructed in accordance with this invention is indicated at 7 which is mounted as illustrated in Fig. 1 on the chassis bar 1. An insulating base plate 8 is mounted on the plate member 9 which is secured as illustrated in Figure 1 to the chassis bar 1 of the motor vehicle. A suitable rectangular casing 10 is mounted around the periphery of the insulating base 8, the casing being provided with a removable cover 11. Two pairs of manually controlled contacts are mounted in the central portion of the plate member 8 as indicated at 12 and 13 respectively, said contacts being normally disengaged and one of which is provided with the insulating button 14 in each pair. At the lower corner portions of the base 8 are two pair of steering gear control contacts 15 and 16 respectively which with respective pairs of contacts 12 and 13 are associated in series with the circuits to right and left direction signals mounted on the front and rear of the motor vehicle as indicated at 7 and 18 respectively in any manner desired, the corresponding pairs of manually and steering gear operated contacts being preferably connected in series with the control signals so that the operation of one signal is dependent upon the cooperation between the operating mechanism for both pairs of contacts.

The operating mechanism for the pairs of contacts above described include similar but reversely constructed units mounted at the opposite ends on the base plate 8 for relative movement and cooperation in the control of the pairs of contacts, the description of one of which is believed to be sufficient for both in view of the similarity in construction and relation of the parts.

The operating mechanism includes a manually operable and movable assembly indicated generally at 19 while a steering gear operated assembly 20 is associated with each manually operated assembly. The manually operated assembly as more particularly shown in Figs. 3, 4, 7 and 8 includes a plate member 21 formed at 22 to slidably receive a channel bar 23 as illustrated in Fig. 6 for slidably mounting the entire assembly on the plate member 8. Projecting from the opposite face of the plate member 21 are the block-like projections 24 from the upper and lower corner portions thereof, the said projections at the upper corner portions forming a guide slidably receiving the operating member 25 which has a flexible connection with the end portion thereof extending upwardly through the housing 26 to the operating knob 27 so that it may be suitably manually operated by the axial movement of the operating wire in the tubing 26 by which the member 25 may be moved downwardly in the assembly 19. At one side of the intermediate portion of the plate member 21 between the projections 24 as clearly shown in Fig. 8 is formed the stud 28 which rotatably receives the angle lever 29 for limited rotating movement and operation by the member 28. This angle lever 29 has a lateral projection at one end as indicated at 30 in Fig. 8 which is adapted to project through the arcuate slot 31 in the cover plate 32 of the assembly 19 which is suitably removably secured to the ends of the projections 24 by screws or the like. A leaf spring member having a reversely bent free end is illustrated in Fig. 11 at 33 which has one end mounted on the outer face of the cover plate 32 of the assembly 19 as clearly shown in Fig. 3 while the reversely bent end extends inwardly between the cover plate and the plate 21 for engagement with one end of the angle lever 29 to normally retain the same in the position shown in Fig. 7. Projections 34 are formed on one side edge adjacent the lower end portion of the cover 32 and the plate member 31 which are provided with recesses 35 adapted to receive the resiliently projected pawl 36 secured to the base 8 and adapted to retain the assembly 19 at the opposite limits of its movement. The opposite side and the upper end of the assembly 19 are provided with a recess portion 36' in which the projections on the limiting member 37 extend for limiting the sliding movement of the assembly 19 on the channel bar 23. The projection 34 on the plate members and the cover plate in the relation of the parts as shown in Fig. 3 projects in line with the button 14 on the pairs of resilient contact members so that in the downward sliding movement on the channel members 23 the assemblies at each side of the base member 8 will engage the respective buttons 14 and move one resilient contact member into engagement with the other.

One of the assemblies 20 is mounted directly below a corresponding assembly 19 as clearly illustrated in Fig. 3 for sliding movement on the channel member 38 which is directly alined below and with the channel members 23.

The steering gear apparatus assembly 20 as more particularly illustrated in detail in Fig. 3 includes a main plate member 40 on one side of which are formed a plurality of projections 41 in a predetermined manner adjacent the corner portions of the plate members. One of these projections 41 is recessed as illustrated at 42 in the space which opens adjacent another relatively close projection 41 as clearly illustrated in Fig. 8 for receiving in interlocking relation an insulating block member 43 having an extension 44 on the lower end thereof which carries a contact member 45 for engagement with the pairs of contacts 15 and 16 respectively for closing the circuits controlled by said contacts. A stud 46 mounted on the plate member 40 and extending laterally as shown in Fig. 8 from one face thereof between the projections 41 rotatably receives the operating pawl 47 which is retained in position by the cover plate 48 removably secured to the free end of the projection 41 as may be clearly ascertained from Figs. 3 and 4. This operation pawl has a lateral projection 49 positioned above the upper end of the plate 40 in the associative relation of the parts which is adapted to normally engage the lower end of the operating assembly 19 above assembly 20 for normally raising the assembly 19 to its upper limit of movement and retaining the same in disposition as shown in Figs. 3 and 7. The movement of the pawl 47 is limited by the above member 41 and the free end engaging with the assembly 19 so that it cannot assume a position which will interfere with the efficient operation of the parts relative to one another. A lateral extension on the lower end of the operating pawl 47 as indicated at 50 projects between the cover plate 48 and the plate member 40 of the assembly 20 and has the leaf spring 51 secured to one of the upper projections 41 on the plate member 40 engaged therewith for normally holding the operating pawl in the position shown in Figs. 3 and 7. Each cover plate 48 is provided on the outer face thereof with a laterally projecting stud 52 adjacent the lower end portion thereof which is freely received within the bifurcated end 53 of the bell crank operating lever 54 having its central portion suitably journaled on the supporting and bearing assembly 55 mounted on the base 8, while the opposite end of the bell crank lever is provided with a laterally projecting stud 56 which freely engages within the cam slot 57 of the operating disk 58. This operating disk is mounted on the shaft 59 rotatable in the bearing assembly 55 and the bearing sleeve 60 mounted in the cover 11 and mounted on the outer free end thereof beyond the cover is the lever 61. This lever 61 is provided with an elongated longitudinal slot 62 illustrated more clearly in the dotted line position of the lever in Fig. 2 which slidably receives the motion transmitting member 63 which is also slidable in the slot 64 of the swinging lever 65 suitably pivotally mounted in the supporting structure 66 on the upper edge portion of the cover 11. The lower end of this lever 65 is formed with a bearing stud 67 on which is mounted the operating link 68 as shown in Fig. 1 connected with the steering arm 4 so that in the operation of the steering arm the levers 61 and 65 will be rotated on a pivot through the cooperation of the slide member 63 in the slotted portion thereof for rotating the shaft 59 which in turn rotates the disk 58 and through the formation of a cam groove 57 in said disk operates the bell crank lever 54 to produce a movement of the steering gear operated assembly 20 downwardly or upwardly on the channel member 38 to engage or disengage the terminals 45 with one of the pairs of contacts 15 or 16 to close the circuit controlled thereby.

The opposite ends of the casing member 10 are provided on the inner faces intermediate the upper and lower ends with projections 69 on which are pivotally mounted the cam levers 70. These cam levers are provided with depending projections 71 intermediate the ends having the lateral extensions 72 formed thereon at the lower ends extending under the assemblies 19 and engaging in the slotted portion 73 of the members 74 removably mounted on the lower ends of the cover plates 32 as clearly shown in Fig. 3. These cam levers 71 have operating heads 75 extending laterally from the free ends thereof which lie in the plane of the disk 58 for engagement by the cam projections 76 removably mounted in a predetermined manner on the periphery of the disk 58. The ends 75 are movable on the body of the cam levers 71 and the resilient leaf spring members 77 normally retain the same in the position shown in Fig. 3.

With the parts associated as above described, illustrated in the drawings and mounted on a motor vehicle as shown in Figure 1 with the corresponding pairs of manually controlled and steering gear controlled contacts connected in series for control of the respective direction signals, it will be understood that to energize one of the signals, the desired knob 27 is operated by depressing the same or moving it inwardly which through the wire mechanism connected therewith moves the operating member 25 downwardly between the projections 24 on the plate member 21 and operates angle lever 29 for engaging the operating pawl 47, moves the same outwardly on a pivot to release projection 49 from engagement under the assembly 19 so that upon the further movement the assembly will move downwardly to its normal position wherein it will be retained by the resiliently projected pawl 36 and the projection 34 will engage button 14 and move the resilient pair of contacts 12 into cooperation for closing the circuit controlled thereby which is also controlled by the pair of contacts 15 when these two pairs of contacts are in series. The downward movement of the assembly 19 will be limited by the member 37 as above described.

This operation is usually completed as the motor vehicle equipped with the invention approaches an intersection where it is necessary to make a turn and immediately before the intersection is reached so that as soon as the turn is started the turning of the steering wheel 3 in the operation of the arm 4 will through the link 68 rotate the disk 58 as above described and produce an operation of the bell crank lever 54 in accordance with the direction of turning so that the assembly 20 will be moved downwardly to bring the terminal 45 into engagement with the pair of contacts 15 thus closing the circuit to the signal controlled by the pairs of contacts 12 and 15 where the assemblies 19 and 20 at the left-hand side of Fig. 3 are operated consecutively and the turn is made in the proper direction. This will through the series circuit with the signals energize the proper signal to give the direction of turning. However, should the operator of the vehicle turn in a direction for which the preparation for the operation of the signal has not been made, then the cam member 76 will move into engagement with the cam lever 71 when the assembly at the wrong end of the base 8 is then in lowered position and will move the entire assembly upwardly to its upward limit of movement and thereby prevent the operation of a false signal.

It will be thus seen that a highly novel control unit has been provided for the circuits of direction signals for motor vehicles in which the manually operated circuit controlling contacts are associated with steering gear operated contacts and have their operating mechanism suitably associated for co-operating in order that the proper turning signal may be given in accordance with the operation of the motor vehicle.

What is claimed is:—

1. A device of the class described, comprising independent pairs of contacts, manually operated means controlling one pair of contacts, automatic means controlling the other pair of contacts, said automatic means being associated with the manually operable means whereby to cause the simultaneous disengagement of the respective contacts.

2. A device of the class described, comprising independent pairs of contacts, independent operating means for each of said pairs of contacts and means connecting said operating means for inter-associated operation whereby the predetermined movement in one direction of one of said operating means will operate the other of said operating means in a predetermined manner and permitting independent operation when moved in an opposite direction.

3. A device of the class described comprising a plurality of pairs of contacts in normally disengaged relation, slidably mounted contact members for said contacts adapted to close the circuit controlled thereby through engagement with the contacts, manual operating means for certain of said contact members, automatic operating means for the other of said members, and means operatively connecting each of the manually operated members with one of the automatically operated members whereby the operation of the manually operated members and the automatically operated members are inter-dependent when moved in a direction for opening the circuit and independent when closing the circuit.

4. A device of the class described comprising a plurality of pairs of contacts in normally disengaged relation, slidably mounted contact members for said contacts adapted to close the circuits controlled thereby through engagement with the contacts, manual operating means for certain of said contact members, automatic operating means for the other of said members and means operatively connecting each of the manually operated members with one of the automatically operated members whereby the operation of the manually operated members and the automatically operated members are inter-dependent when moved in a direction for opening the circuit and independent when closing the circuit, the initial closing movement of the manually operated members serving to disconnect the same from its associated automatically operated member and the closing of the automatically operated member operating to permit the connection of the same with its associated manually operated member.

5. A device of the class described comprising independent pairs of contacts, manually operating means controlling one pair of contacts, automatic means controlling the other pair of contacts, said automatic means being associated with the manually operable means whereby to cause the simultaneous disengagement of the respective contacts when moved in one direction and arranged for independent operation when moved in an opposite direction.

6. A device of the class described comprising independent pairs of contacts, manually operated means controlling one pair of contacts, automatic means controlling the other pair of contacts, said automatic means being associated with the manually operable means and means connecting said manual and automatic control means whereby to cause the simultaneous disengagement of the respective contacts when moved in one direction, the initial movement of the manual control means in an opposite direction operating to disengage the same from said automatic control means permitting independent operation thereof in said opposite direction.

7. A circuit closer comprising independent pairs of movable contacts, manually operable means for one pair of said contacts, automatic operating means for the other pair of the contacts and including a reciprocably actuated arm, a rotatable member operable by said arm and eccentric groove formed in said member, and a pair of oppositely disposed bell crank levers, each having a pin at one end slidably arranged in said groove whereby to oppositely actuate the respective levers upon the opposite rotation of said members, and means operatively connecting the opposite ends of the bell cranks to one of the contacts of said other pair, and interconnecting means for one of the contacts of each pair adapted for simultaneously moving the same into circuit open position.

8. A circuit closer comprising independent pairs of movable contacts, manually operable means for one pair of said contacts, automatically operating means for the other pair of said contacts and including a reciprocably actuated arm, a rotatable member operable by said arm, an eccentric groove formed in said member, a pair of oppositely disposed bell crank levers having a pin at one end slidably arranged in said groove, whereby to oppositely actuate the respective levers upon the opposite rotation of said member, means operatively connecting the opposite ends of the bell cranks to one of the contacts of the other pair, interconnecting means for one of the contacts of each pair, adapted for simultaneously moving the same into circuit open position, and releasing means for said interconnected means operable upon the initial movement of the manually operable means, for disconnecting the contact for independent movement of said contacts.

9. A circuit closer comprising independent pairs of movable contacts, manually operable means for one pair of said contacts, automatically operated means for the other pair of contacts and including a reciprocably actuated arm, a rotatable member operable by said arm, an eccentric groove formed in said member, a pair of oppositely disposed bell crank levers each having a pin at one end slidably arranged in said groove, whereby to oppositely actuate the respective levers upon the opposite rotation of said member, means operatively connecting the opposite ends of the bell crank to one of the bell cranks of said other pair, and interconnecting means for one of the contacts of each pair adapted for simultaneously moving the same into open position, said interconnected means being ineffective for moving said manually operated contact upon the actuation of the automatically operated contact into circuit closing position.

In testimony whereof I affix my signature.

NICHOLAS GREGORIEFF.